(12) United States Patent
Harvey (10) Patent No.: US 8,137,007 B1
(45) Date of Patent: Mar. 20, 2012

(54) MINIATURIZED TURRET-MOUNTED CAMERA ASSEMBLY

(75) Inventor: William B. Harvey, Laytonsville, MD (US)

(73) Assignee: Brandebury Tool Company, Inc., Gaithersburg, MD (US)

( * ) Notice: Subject to any disclaimer, the term of this patent is extended or adjusted under 35 U.S.C. 154(b) by 112 days.

(21) Appl. No.: 12/351,587

(22) Filed: Jan. 9, 2009

Related U.S. Application Data (60) Provisional application No. 61/020,656, filed on Jan. 11, 2008.

(51) Int. Cl.
G03B 39/00 (2006.01)
G03B 17/00 (2006.01)

(52) U.S. Cl. .......................................... 396/427; 396/12
(58) Field of Classification Search ................... 396/12, 396/427
See application file for complete search history.

(56) References Cited

U.S. PATENT DOCUMENTS

| | | | | | |
|---|---|---|---|---|---|
| 2,604,281 | A | * | 7/1952 | Buchal et al. | 244/129.5 |
| 5,365,291 | A | * | 11/1994 | Maeda | 396/12 |
| 7,128,479 | B2 | * | 10/2006 | Chapman | 396/428 |
| 7,283,155 | B1 | * | 10/2007 | Marks, Jr. | 348/85 |
| 2002/0081110 | A1 | * | 6/2002 | Johnson et al. | 396/12 |
| 2003/0194230 | A1 | * | 10/2003 | Tamura | 396/427 |
| 2005/0029399 | A1 | * | 2/2005 | Lowe et al. | 244/118.1 |

* cited by examiner

*Primary Examiner* — Rodney Fuller
(74) *Attorney, Agent, or Firm* — Lieberman & Brandsdorfer, LLC (57) ABSTRACT

A lightweight camera mounting assembly allowing for tilt and pan of a camera through a significant portion of a spherical range of views with minimal parts, minimal weight, and a full 360 degree freedom of rotation. A combined retraction and extension assembly for the camera is provided with minimal weight and complexity. The assembly includes doors which open to allow the camera to extend beyond the surface of a vehicle and to close to protect the camera and allow for landing of the vehicle without external skids.

11 Claims, 13 Drawing Sheets

MINIATURIZED TURRET-MOUNTED CAMERA ASSEMBLY

CROSS REFERENCE TO RELATED APPLICATION(S)

This application is a non-provisional patent application claiming the benefit of the filing date of U.S. Provisional application Ser. No. 61/020,656 filed on Jan. 11, 2008, and titled "Miniaturized Turret-Mounted Camera Assembly", which is hereby incorporation by reference.

BACKGROUND OF THE INVENTION

1. Technical Field

This invention relates to a mounting assembly for a camera in a vehicle structure. More specifically, the invention relates to a moveable mounting assembly that allows pan and tilt of the camera within the vehicle structure.

2. Description of the Prior Art

An unmanned aerial vehicle (UAV), sometimes called an unmanned air-reconnaissance vehicle, is a non-piloted aircraft. UAVs are known in the art and can be operated via remote control or fly autonomously based on pre-programmed flight plans or more complex dynamic automation systems. UAVs are currently used in a number of military roles, including reconnaissance and attack. They are also used in a small but growing number of civil applications such as firefighting where a human observer would be at risk, police observation of civil disturbances and scenes of crimes, and reconnaissance support in natural disasters. Accordingly, UAVs are often preferred for missions where the risk to human life is mitigated.

There are a wide variety of UAV shapes, sizes, configurations, and characteristics. For the purposes description and to distinguish UAVs from missiles, a UAV is defined as an aircraft capable of being controlled, sustained level flight and powered by a jet or reciprocating engine. Cruise missiles are not classed as UAVs, because, like many other guided missiles, the vehicle itself is a weapon that is not reused even though it is also unmanned and might in some cases be remotely guided.

UAVs typically fall into one of six functional categories, although multi-role airframe platforms are becoming more prevalent. Such categories include: target and decoy to provide ground and aerial gunnery to a target that simulates an enemy aircraft or missile, reconnaissance to provide battlefield intelligence, combat to provide attack capability for high-risk missions, logistics for UAVs specifically designed for cargo and logistics operation, research and development used to further develop UAV technologies to be integrated into field deployed UAV aircraft, and civil and commercial UAVs for UAVs specifically designed for civil and commercial applications. In one embodiment, UAVs can also be categorized in terms of range and/or altitude.

It is also know in the art for UAVs to have remote sensing functions to gather data. Sensors employed in UAVs include electromagnetic spectrum sensors, biological sensors, and chemical sensors. A UAV's electromagnetic sensor typically includes visual spectrum, infrared, or near infrared cameras as well as radar systems. Other electromagnetic wave detectors such as microwave and ultraviolet spectrum sensors may also be used, but are uncommon. Biological sensors are sensors capable of detecting the airborne presence of various microorganisms and other biological factors. Chemical sensors use laser spectroscopy to analyze the concentrations of each element in the air. Accordingly, it is known in the art for various sensors to be employed with UAVs for gathering data during an ariel flight.

However, there are problems with UAVs and cameras employed therewith. Such problems include issues with weight of the camera. One of the goals of the UAV is to reduce the weight of the vehicle. Therefore, it is desirable to mitigate the weight of the camera and an associated camera assembly. Other problems with UAVs and their associated cameras include the ability of the camera to rotate and spin in an unlimited manner. Prior art cameras employed with UAVs have such limitations, which reduces the functionality of the camera.

The limitations associated with cameras in UAVs extend to all forms of vehicles, including, land, and air and sea vehicles. Accordingly, there is a need for an improved mounting assembly in a vehicle to accommodate proper operation of a camera therein. The mounting assembly should be configured to support a lightweight camera with full viewing across all viewing angles.

SUMMARY OF THE INVENTION

In one aspect of the invention, a camera mount is provided with a base having an aperture, and a yoke pivotally mounted over the base. A camera semi-shell is pivotally mounted to the yoke. A pan servo is provided to rotate the yoke with respect to a pan axis, and a tilt servo is provided to rotate the camera semi-shell with respect to a tilt axis. The pan axis is perpendicular to the base, and the tilt axis is parallel to the base, with the respective servos mounted on the base. First and second position feedback means are provided to monitor the extent of rotation implemented by the pan and tilt servos.

In another aspect of the invention, a camera mount is provided with a housing having a retraction assembly mounted therein. The retraction assembly includes an output arm being extended and retracted with respect to the housing. A camera semi-shell is pivotally mounted to the output arm. Furthermore, the mount includes a pan servo to rotate the camera semi-shell about a pan axis, and a tilt servo to rotate the camera semi-shell about a tilt axis. In addition, a retract servo functions to retract and extend the camera semi-shell with respect to the housing.

In yet a further aspect of the invention, a method is provided for operating a camera mount. A yoke is pivotally mounted over a base, and a camera semi-shell is pivotally mounted to the yoke. Two servos are provided to support rotation of the yoke. More specifically, a pan servo rotates the yoke with respect to a pan axis, and a tilt servo rotates the camera semi-shell with respect to the tilt axis. The pan axis is perpendicular to the base; and the tilt axis is parallel to the base. The extent of rotation implemented by both the pan and tilt servos is monitored with first and second position feedback means.

Other features and advantages of this invention will become apparent from the following detailed description of the presently preferred embodiment of the invention, taken in conjunction with the accompanying drawings.

BRIEF DESCRIPTION OF THE DRAWINGS

The drawings referenced herein form a part of the specification. Features shown in the drawing are meant as illustrative of only some embodiments of the invention, and not of all embodiments of the invention unless otherwise explicitly indicated. Implications to the contrary are otherwise not to be made.

DESCRIPTION OF THE PREFERRED EMBODIMENT

Overview

A turret assembly is disclosed for accommodating a small and lightweight camera. The assembly is configured to be mounted on a land based vehicle, a water based vehicle, or an aerial vehicle. The features of the turret assembly include a remote-feedback, servo-operated pan function, and a control cable linked tilt function. The combination of the pan and tilt function supports movement of the camera within the turret assembly. The pan function includes a rotating vertically oriented camera yoke driven by a servomechanism via a chain or other positive drive means, such as a belt. A positive feedback potentiometer is connected to a yoke in a manner that permits the positive feedback potentiometer to feedback the horizontal angle of the yoke, and thus, the camera's pan position, as opposed to the position of a servo drive shaft to a controller. The servo mechanism of the turret assembly also includes removal of any mechanical stops on the servo drive train to allow continuous rotation of the servo motor. This permits the servo drive train to be geared up or down, including at least 360 degrees of movement, without changing the desired camera rotation. In one embodiment, the rotation amount may be modified by changing the feedback ratio of the position feedback potentiometer.

In a further embodiment of the turret assembly, a tilt function to the camera is provided through the use of a flexible control cable that is used to rotate the angle of the camera with respect to the vertical axis of the yoke. The control cable is routed to the camera turret through a sheath which passes through the center of rotation of the yoke, thus permitting the yoke to turn, i.e. pan, without also turning the sheath or retracting or extending the control cable or interfering with it's operation. The driving end of the tilt cable is attached to the inside of the turret shell offset from the vertical axis of the yoke. A pull or push on the cable will result in a rotational displacement of a turret ball of the turret assembly wherein the camera is mounted. This will also bring about rotational displacement of the camera about a horizontal axis defined by connection points of a U-shaped yoke to the turret. In one embodiment, a drive end of the control cable may be attached directly to either a servo-driven crank handle for small applications, or to a bell crank mechanism for longer stroke applications.

The turret mounted camera assembly further comprises a camera connection harness having electrical wiring to provide power to the camera, as well as cable connection for signal transmission to and from the camera. In one embodiment, the camera may support wireless communication. Such an embodiment would accommodate remove of the requirement for the signal cable. Furthermore, in one embodiment additional conductors may be provided to support features such as zoom, iris adjustment, and/or installation of digital data input.

Technical Details

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 1:
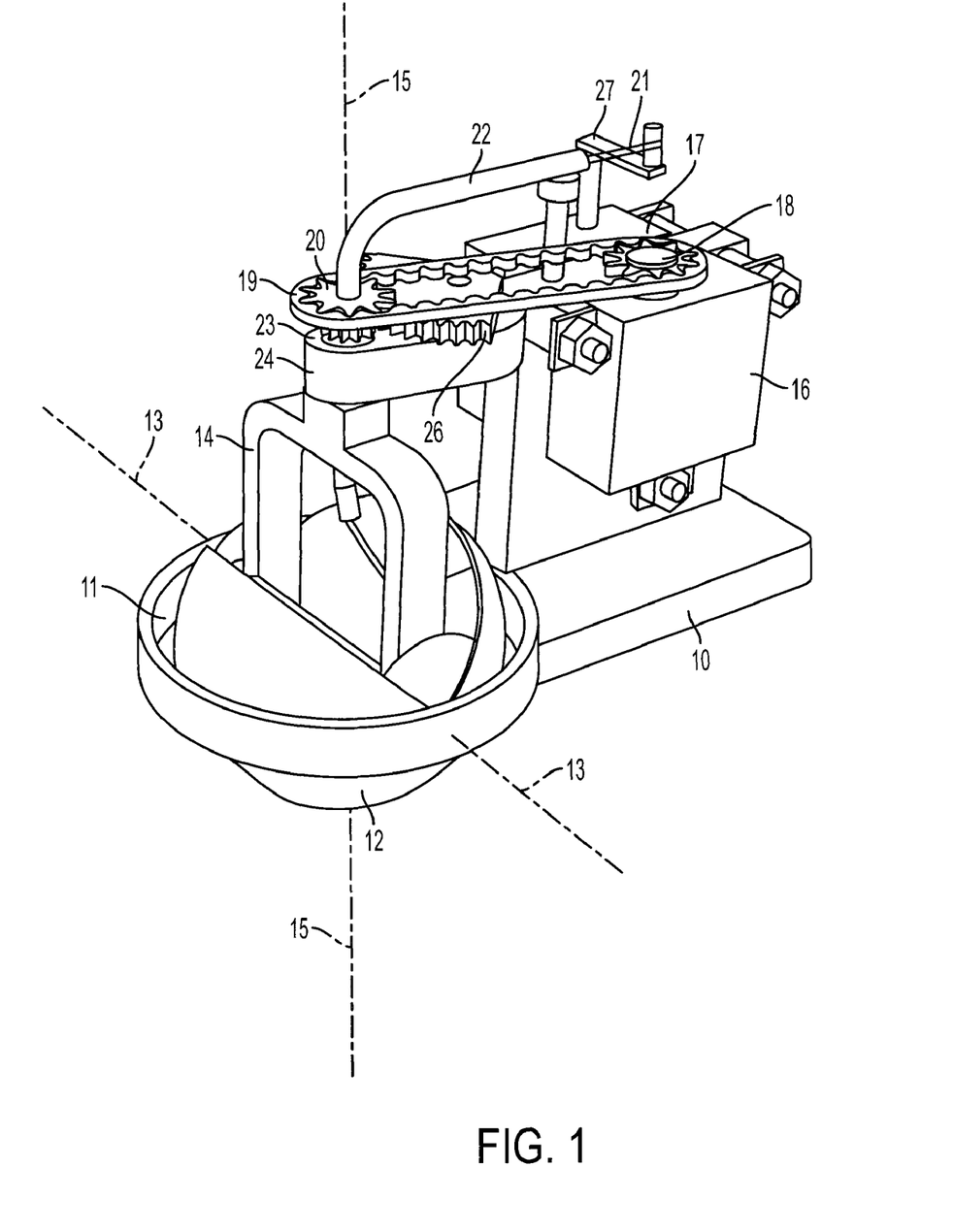
FIG. 1 is a perspective view of the turret-mounted camera assembly as seen from the upper front right perspective.
Figure 2:
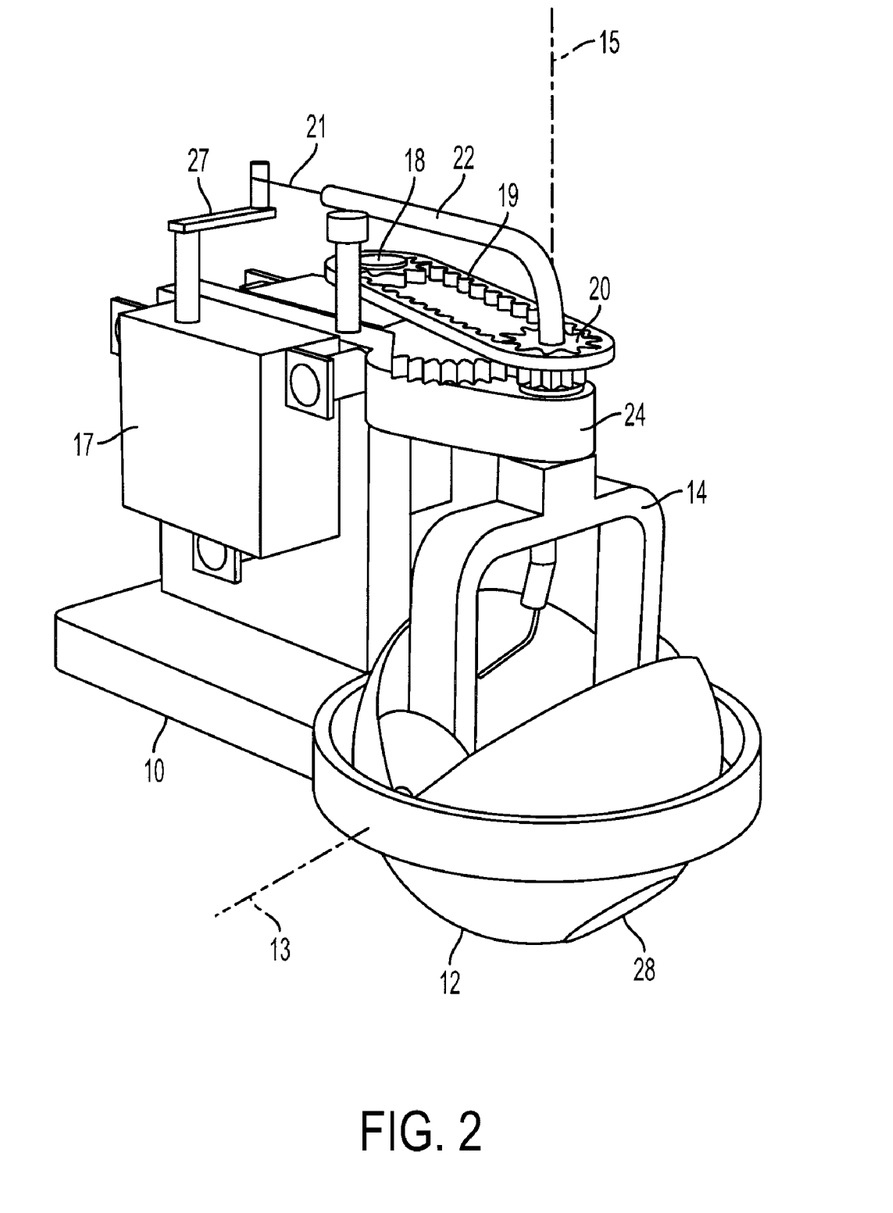
FIG. 2 is a perspective view of the turret-mounted camera assembly as seen from the upper front left perspective.

FIG. 1 is a perspective view of one embodiment of the camera mount. As shown, the camera mount includes a base portion (10) with a circular opening (11). The camera semi-shell (12) is pivotally mounted to a yoke (14) within the opening (11) to allow the semi-shell (12) to tilt about axis (13). The semi-shell (12) is not connected to the base (10). The disconnection between the base (10) and the semi-shell (12) supports rotation of the semi-shell (12) about pan axis (15). The tilt and pan axis (13) and (15), respectively, are shown horizontal and vertical. However, in one embodiment, the assembly of the present invention can be oriented in any direction and may assume unlimited orientations.

A pan servo (16), acting as part of a servomechanism, and a tilt servo (17), acting as part of a servomechanism, are mounted on the base (10). In addition, a drive transfer link (19), driven by drive gear (20) driven by a drive mechanism, is provided to allow for positive pan positioning of the camera semi-shell (12). In one embodiment, the drive mechanism can be a tooth drive belt, a drive chain, or any other positive drive mechanism which will allow for positive pan positioning of the camera semi-shell (12). Drive transfer link (19) is connected to pan gear (20) for rotation of the yoke (14) about pan axis (15). Tilt cable (21) passes through the center of pan gear (20) and does not rotate with the pan gear (20). Title cable (21) slides laterally within conduit (22).

Figure 3:
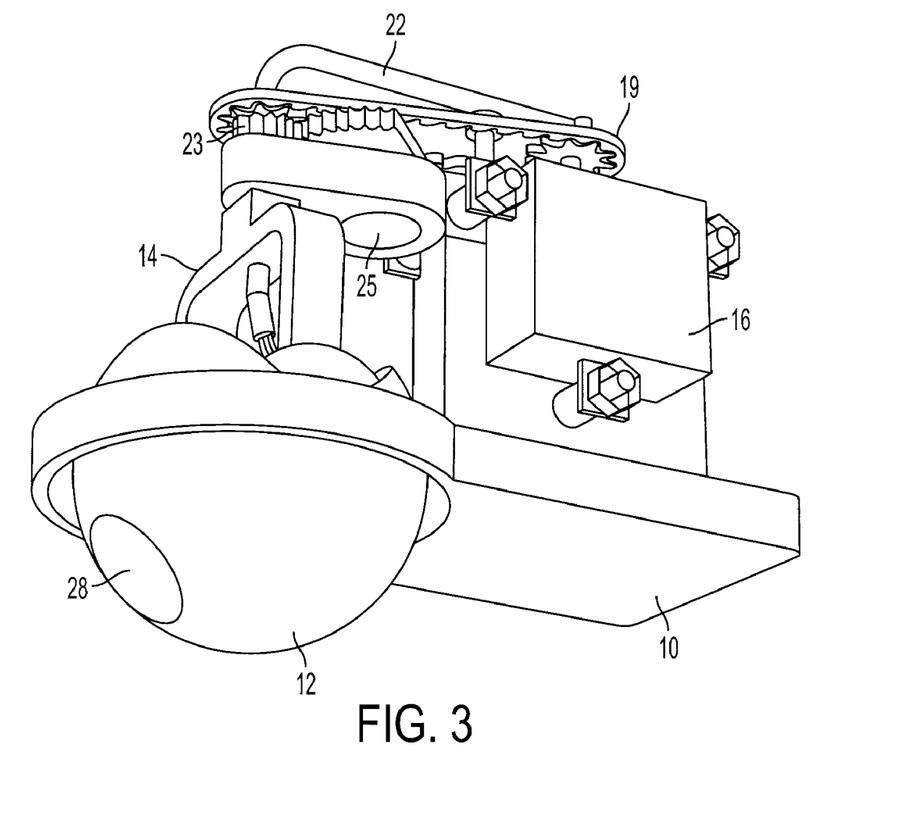
FIG. 3 is a perspective view of the turret-mounted camera assembly as seen from the lower front left perspective.
Figure 4:
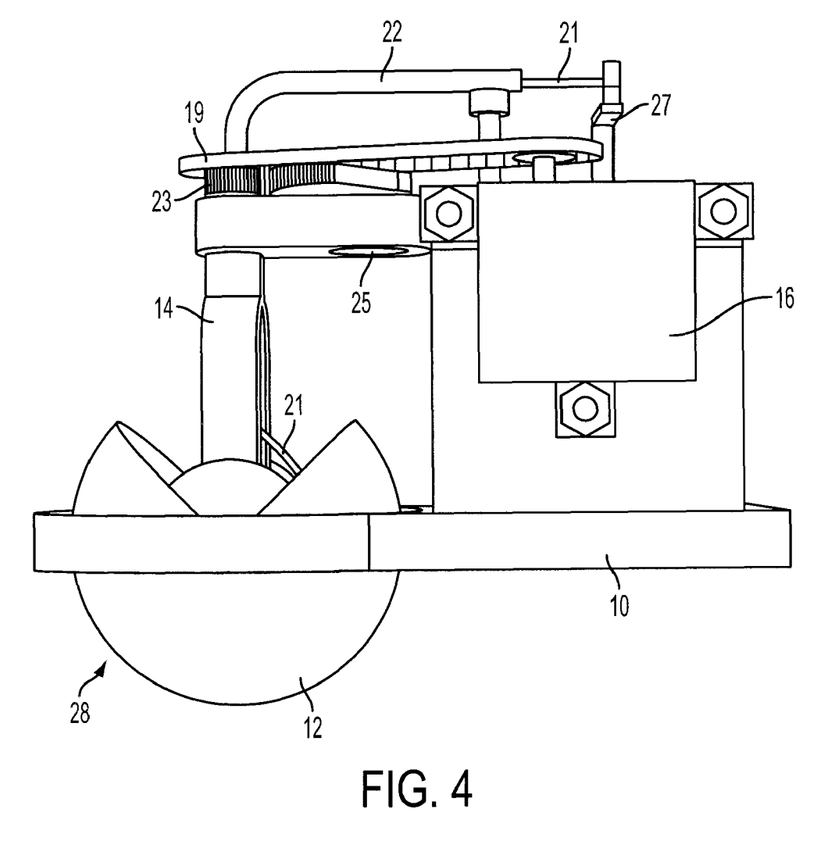
FIG. 4 is a right side view of the turret-mounted camera assembly.

The pan function comprises a rotating and vertically mounted camera yoke (14). In one embodiment, the camera yoke (14) has a U-shape. The camera yoke (14) is driven by servomechanism (16), gears (18) and (20), and drive transfer link (19). One of the elements of the camera yoke (14) driver is gear (20), which drives a follower gear (23) and the end of the yoke (14), which is retractably mounted in housing arm (24). A position feedback potentiometer (25), shown in FIG. 3, used with a servo motor is connected to follower gear (23) through feedback gear (26). The potentiometer (25) is connected to the yoke (14) in a manner that permits the potentiometer (25) to feedback the horizontal rotation angle of the yoke (14), and thus the pan position of the camera semi-shell (12) to a controller (not shown). The connection of the potentiometer (25) to the yoke (14) does not support feedback of the position of the servo motor drive shaft. As a part of the servo modification, any mechanical stops on the servo-drive train within servo (16) are removed to allow continuous rotation of the servo motor. This permits the servo drive train to be geared up or down without changing the desired camera rotation. In one embodiment, the desired camera rotation may include 360 degrees of movement. The rotation amount may be modified by changing the feedback ratio of the potentiometer drive gear (26).

The tilt function is implemented by use of a flexible control-cable (21) housed within a sheath (22). The cable is pulled and pushed by crank (27) driven by the servo (17). The cable rotates the angle of the camera (28) with respect to the axis (13) of the yoke (14). The extent of rotation is monitored by a potentiometer (not shown) housed within the servo (17). The control cable (21) is routed to the camera semi-sphere turret (12) through a sheath (22) which passes through the center of rotation of the yoke (14), thus permitting the yoke (14) to turn, i.e. pan, about axis (15) without also turning the sheath (22) or retracting or extending the control cable (21). The driving end of the tilt cable (21) is attached to the inside of the turret semi-shall (12), offset from the axis (13) of the yoke (14). A pull or push on the cable (21), will result in a rotational displacement of the turret semi-shell ball (12), and thus the camera (28) about a horizontal axis (13) defined by the connection points of the U-shaped yoke (14) to the turret ball (12). The driven end of the control cable (21) is shown attached directly to a servo-driven crank handle (27). However, in one embodiment, the drive end of the control cable (21) may be attached to a bell crank mechanism (not shown) for a longer stroke application.

The attachment of the control cable (21) to both the turret (12) and the drive mechanism (27) may be either a fixed connection or via a swivel connection. The fixed connection results in twisting of the cable within the sheath during panning movements. The swivel connection permits total freedom of movement. Less expensive fixed-end connections with their accompanying twisting of the control cable has been shown to operate in an acceptable manner in practice. In one embodiment, to accommodate continuous pan rotation, slip rings can be incorporated into the tile function linkage.

Figure 5:
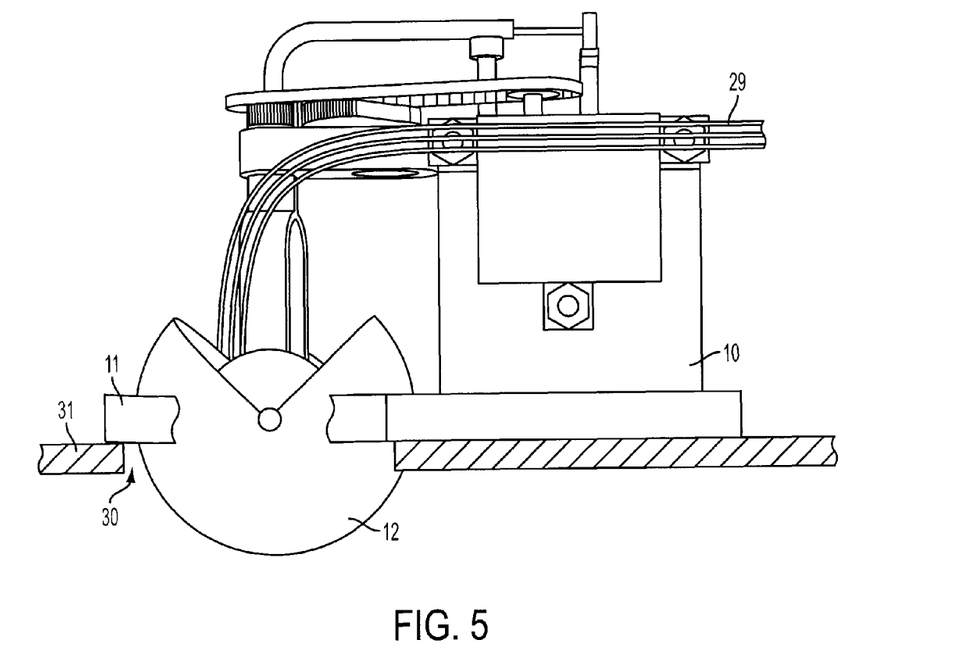
FIG. 5 is a right side view of the turret-mounted camera assembly showing the mechanical linkage assembly thereof.

The turret mounted camera assembly also includes a camera connection harness (29), as shown in FIG. 5. The harness (29) includes wiring for camera power, as well as cabling for signal transmission. In one embodiment, the camera employed in the turret is a wireless camera, which does not require a signal cable. Furthermore, in one embodiment, additional conductors for feature such as zoom and iris adjustment, or digital data input may also be installed.

The use of the control cable (29) in combination with the remote potentiometer linkage minimizes the amount of hardware directly associated with the movement of the camera (28). This inventive assembly provides for a much simplified operation of the combined pan/tilt functions than is found in the prior art and permits the overall assembly to be reduced in both size and weight, fostering a significant improvement in remote guided aircraft camera systems.

The base (10) provides sufficient mounting flexibility that the camera assembly can be mounted in any orientation so long as the camera is oriented in the desired direction of view. The camera assembly can be mounted on an exterior surface such as a wall or the exterior of a vehicle. As shown in FIG. 5, the camera assembly can be mounted such that the semi-shell (12) housing the camera (28), extends through a hole (30) in a plate (31). Furthermore, as shown in FIG. 5, a portion of the base (10) is in a cutaway view in the area of the hole (30) to illustrate the tilt axis (13) and the protrusion of the semi-shell (12) through hole (30) in plate (31). In one embodiment, plate (31) can be an external surface of a vehicle, such as a lower portion of the fuselage of a surveillance aircraft or the top surface of the body of a surveillance vehicle.

Figure 6:
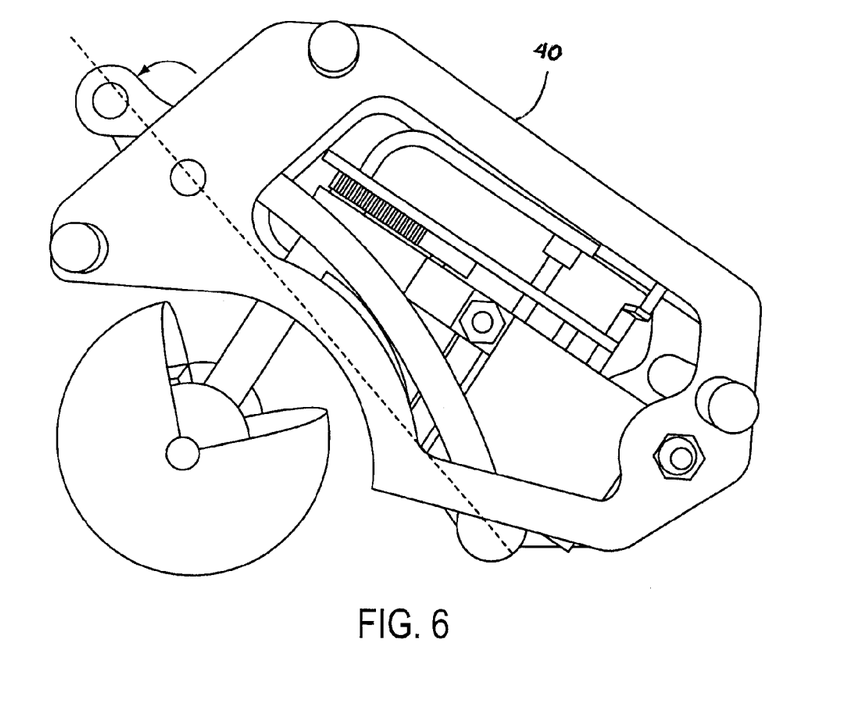
FIG. 6 is a perspective view of a camera assembly mounted on an extension and retraction mechanism.
Figure 7:
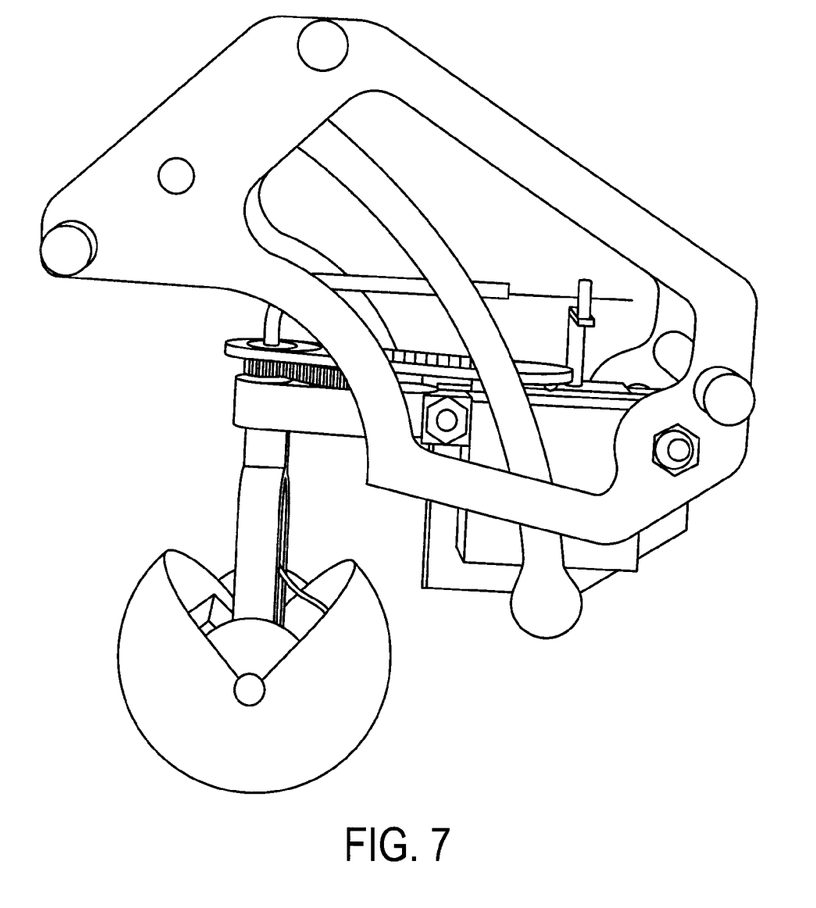
FIG. 7 is a perspective view of a camera assembly mounted on an extension and retraction mechanism.
Figure 8:
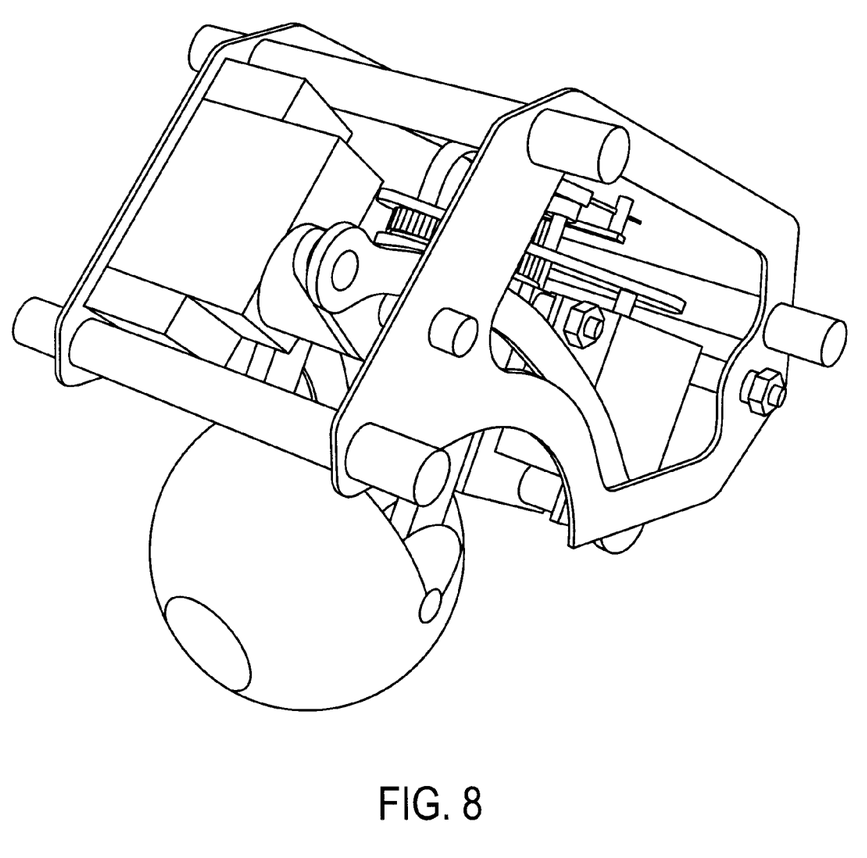
FIG. 8 is a perspective view of a camera assembly mounted on an extension and retraction mechanism.
Figure 9:
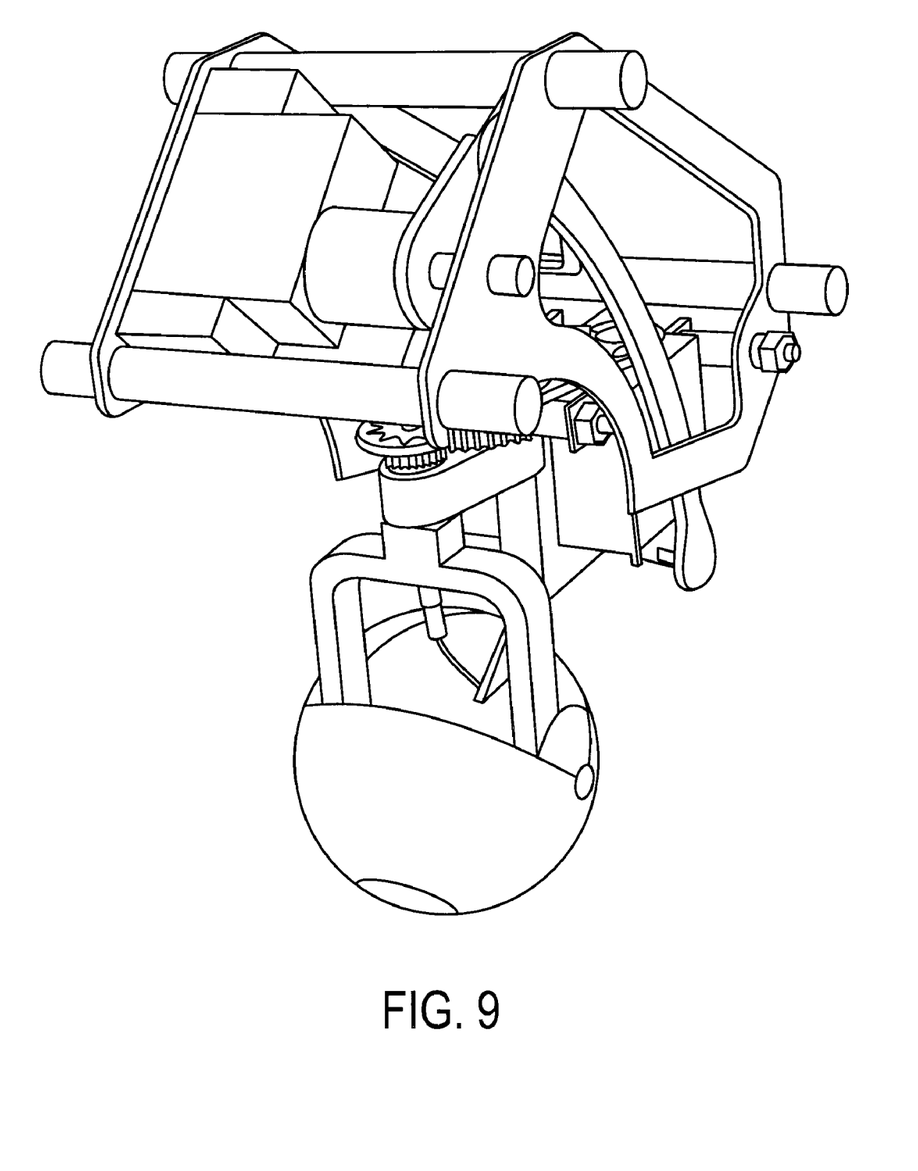
FIG. 9 is a front view of camera assembly mounted on an extension and retraction mechanism.
Figure 10:
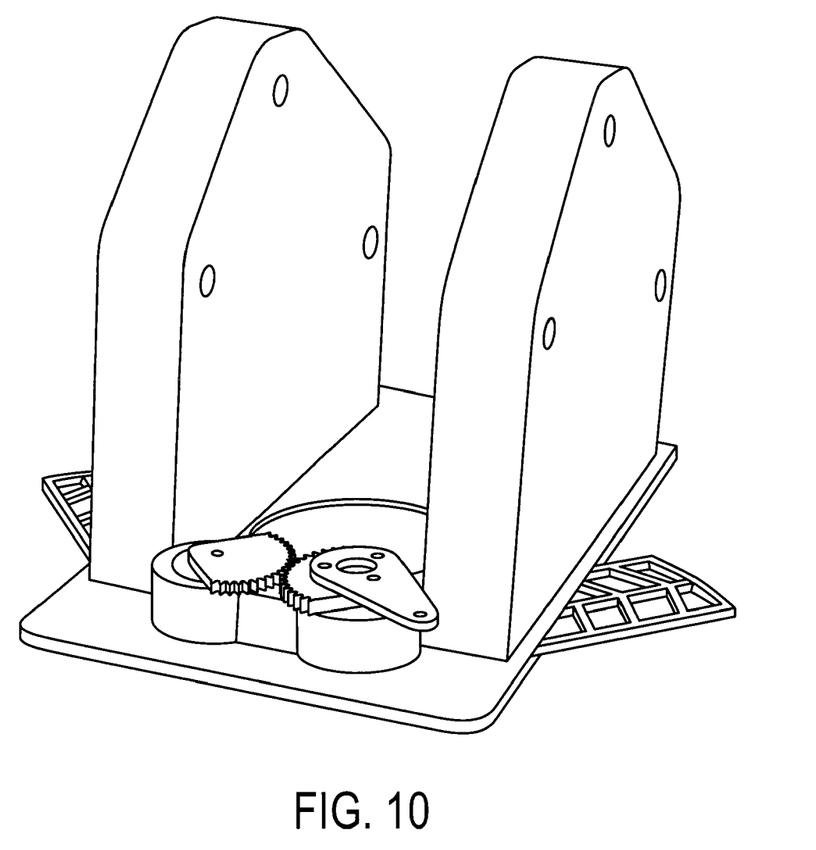
FIG. 10 is a perspective view of a camera mount and associated doors of the extension and retraction mechanism.
Figure 11:
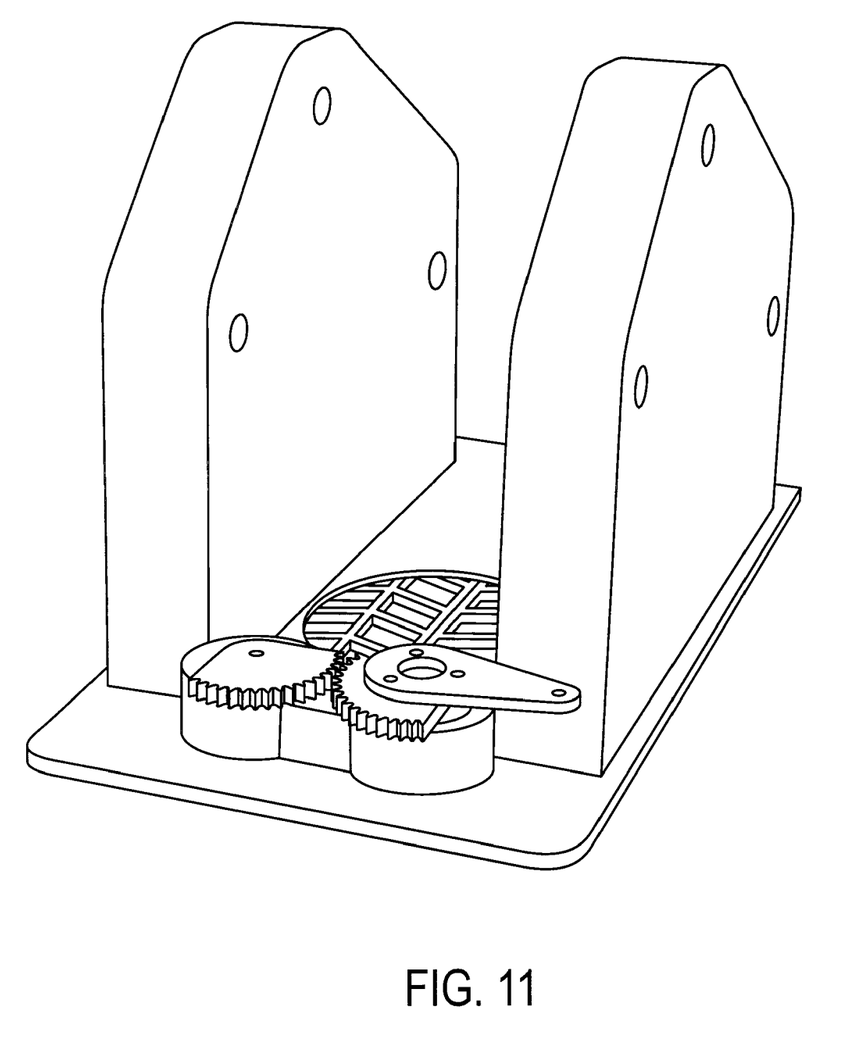
FIG. 11 is a perspective view of a camera mount and associated doors of the extension and retraction mechanism.
Figure 12:
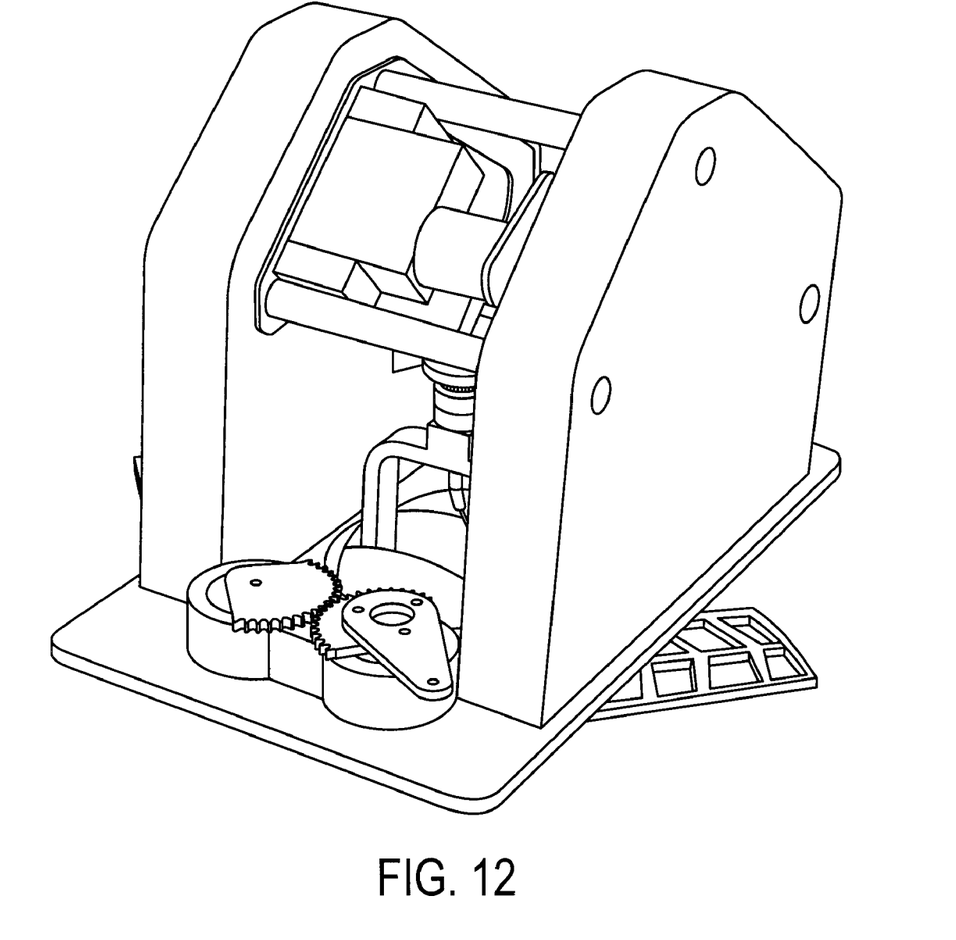
FIG. 12 is a perspective view of a camera mount and associated doors of the extension and retraction mechanism with the doors in an open position and the camera in an extended position.
Figure 13:
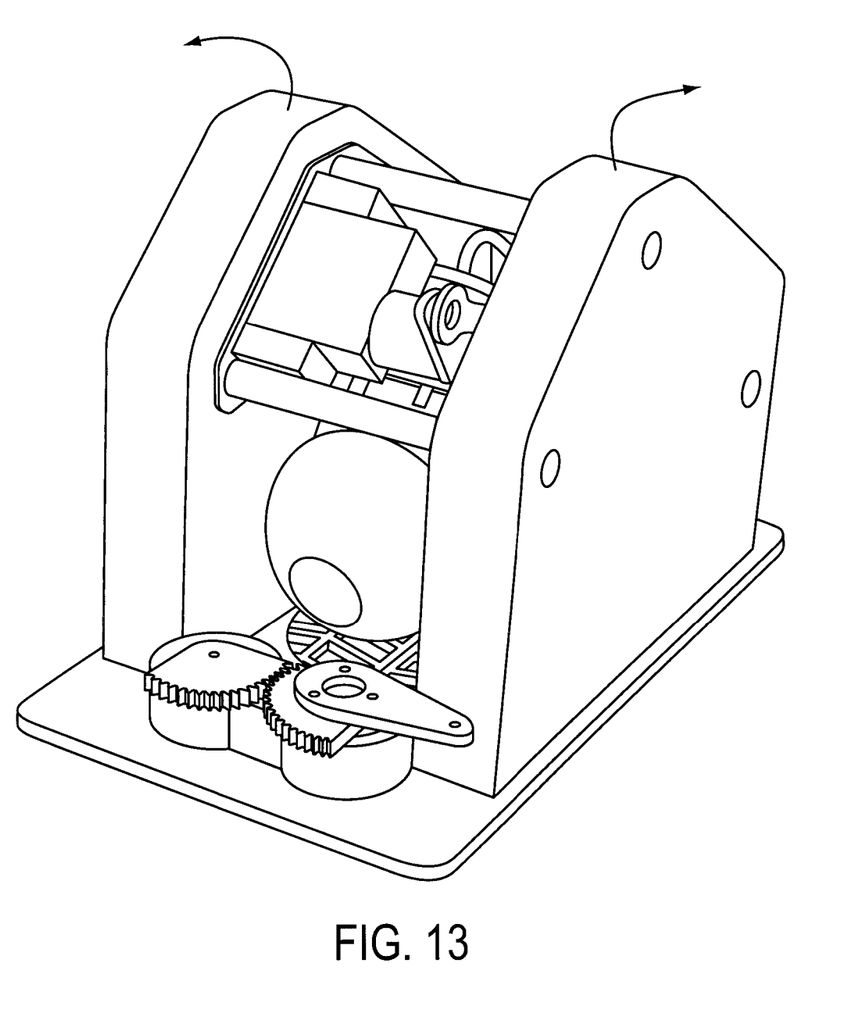
FIG. 13 is a perspective view of a camera mount and associated doors of the extension and retraction mechanism with the camera unit in a non-extended position and with the door in a closed position.

Another embodiment is shown in detail in FIGS. 6-13, wherein the camera assembly is shown mounted on an extension and retraction assembly (40). As illustrated in FIGS. 6-13, the camera assembly can be mounted on an assembly (40) that supports both extension and retraction. In the embodiments shown in FIGS. 6-13, the assembly (40) is substituted for the base (10) shown in FIGS. 1-5. An advantage of the extension and retraction assembly (40) is that it provides the ability to retract the camera unit when desired, thus eliminating having the semi-shell extending beyond a mounting surface. As shown in FIGS. 6, 7, and 13 the camera is in an up and locked position, otherwise known as retracted position. FIG. 13 in particular shows the camera in the retracted position within a housing unit with doors that enable the extended position of the camera closed. FIG. 11 shows the housing in details with the doors in a closed position. The housing is configured to accommodate vibration and shock. Two walls of the housing are provided to hold the camera unit in a manner that accommodates the full extension and retraction capabilities. In one embodiment the walls are comprised of an elastomeric materials or foam. Each wall has an anchoring post aperture to accommodate the camera unit. A bottom wall of the housing unit includes doors that open and close. It is these doors through which the camera assembly extends and retracts. In one embodiment, the doors open and close in a manner similar to wings of a beetle. Two synchronizing gears are provided on the bottom wall of the housing adjacent to the doors to control the opening and closing of the doors. Each of the synchronizing gears is in communication with high strength door bearings, which sit on a mounting plate. In one embodiment, the mounting plate is comprised of a carbon fiber material. At least one of the synchronizing gears is in communication with a linkage that connects to a separate servo that in effect opens and closes both doors. FIG. 10 is another view of the housing with the doors of the bottom wall in an open position. As shown, the linkage in communication with the gears is in an alternate position in comparison to the position shown in FIG. 11. The invention should not be limited to housing with doors in the bottom wall. In one embodiment, the housing may not accommodate doors that open and close in the bottom wall. Such an embodiment may accommodate the extension and retraction mechanism, however, the area where the doors are located would be a permanent opening in the bottom wall of the housing.

FIGS. 6-9 show the details of the camera unit assembly, including the servo, the servo arm output, the secondary servo shaft, the anchoring posit, the pan servo drive chain, and the tilt cable, all in communication with the camera. The are additional elements that support the unit and its extension and retraction characteristics, including those elements noted in FIGS. 6-9.

The extension and retraction camera unit is in communication with a controller that dictates the deployment of the camera. The controller can be local to the unit, or remote. Similarly, in one embodiment, the controller may be in wireless communication with the unit, or wired. The controller includes a processor in communication with memory, and supports computer readable instructions to the camera unit. Through the instructions, the controller not only communicates the position of the camera with respect to extension and retraction, but also with respect to pan and tilt. The controller dictates both the position of the camera with respect to the unit, and the position of the camera with respect to pan and tilt. In one embodiment, the camera may control the operation of the vehicle in which the camera unit is mounted. For example, GPS coordinates may be communicated to the camera, and based upon the position required for the camera, the vehicle may be piloted in an automated manner to accommodate the coordinates communicated to the camera. In other words, the camera may dictate the flight and/or travel plan of the vehicle. The camera together with a controller and an autopilot guidance system are all in communication. Guidance may be dynamically changed based upon instructions from the camera, controller, and/or vehicle guidance system.

The extension and retraction system from the camera can be advantageous as it support the camera unit to be extracted when used in air vehicles for reduction of drag when in flight, and for each of storage and reduction of damage to the camera assembly. It is also important to retract the camera assembly on air vehicles which do not have landing gear. Air vehicles without landing gear are known in the art of unmanned vehicles. Unmanned air vehicles are frequently launched via hand or catapult. If the camera unit does not extend beyond the surface of the aircraft during take off or landing, the skids needed for the aircraft can be smaller and present less drag during flight. With the present invention, doors can be used for landing, thereby eliminating the need for skids.

The extension and retraction assembly of the present invention minimizes weight by employing a carbon fiber plate chassis and pivot points that are integral with the pan and tilt mounting bolts. The design of the present invention minimizes parts and allows the unit to be light weight. The unit is lock in a retracted position by implementation of an over center banana shaped link that allows clearance when the servo output shaft is supported on both sides of the output arm. This type of support is essential because of the extreme load that may occur during a hard landing. Additionally, the banana shaped link, while made of carbon fiber in a preferred embodiment, can flex under extreme loads that may be experienced during hard landings.

While retraction can be used along to reduce drag and to allow for minimized landing skids to further protect the camera and to streamline the unit in flight, doors may be provided. Frequently, during the autonomous dashing stage of flight to a particular destination, the surveillance camera is not used. With the doors in a closed position, the vehicle is cleaner aerodynamically and can move faster and more efficiently. The doors open like the hard outside wings of a beetle and are preferably oriented for minimum drag.

A further advantage of the design of the present invention which includes doors, is the ability to use the doors as landing skids, thus eliminating the drag associated with landing skids required when a camera is mounted extending below the fuselage. The door unit is isolated from the camera by employing elastomeric members that capture the camera unit with the retracting mechanism and also attach to the door mechanism and attaching plate. In one embodiment, the elastomeric members may be in the form of rubber or foam.

The sequencing of the doors and the extension retraction are electronically coordinated, thereby allowing for landings without external skids, and without transmitting undue shock to the camera and protecting the camera assembly during flight and storage.

Advantages Over the Prior Art

The use of the control cable in combination with the remote potentiometer linkage minimizes the amount of hardware directly associated with movement of the camera within the turret assembly. This inventive assembly provides for a simplified operation of the combined pan and tilt functions than is found in the prior art, and it also permits the overall assembly to be reduced in both size and weight, thereby fostering improvement in remote guided aircraft camera systems.

Furthermore, the doors of the turret assembly may be configured with landing skids. This added feature eliminates drag associated with landing skids that is conventionally required when a camera is mounted in a position that extends below the fuselage. The doors are isolated from the camera by employing elastomeric members that capture the camera unit with the retracting mechanism, and also attach to the door mechanism and attaching plate. In one embodiment, the elastomeric members may be in the form of rubber or foam. Sequencing of the doors and the extension and retraction thereof are electronically coordinated. This coordination allows for landings without external skids without transmitting undue shock to the camera and protecting the camera assembly during flight and storage.

The assembly supports extension and retraction of the camera in communication with the mount, to enable the camera to be extended in one position and retracted for another position. The assembly may include an opening in a bottom wall thereof through which the camera may extend or retract there from. In an operation, the camera mount enables 360 degrees tilt and pan of the camera therein. In one embodiment, the camera is a full functioning camera with a 10:1 zoom capability. The weight of the camera mount assembly may be 8 ounces with a 3 ounce camera and shock mounts to support the camera. Accordingly, a light weight camera together with a camera mount assembly is provided for a vehicle.

Alternative Embodiments

It will be appreciated that, although specific embodiments of the invention have been described herein for purposes of illustration, various modifications may be made without departing from the spirit and scope of the invention. In particular, the attachment of the control cable to both the turret and the drive mechanism may be either a fixed connection or connections made via swivels. A fixed connection results in twisting of the cable within the sheath during panning movements. Connections made via swivels permit total freedom of movement. In one embodiment, fixed-end connections with their accompanying twisting of the control cable have been shown to operate in an acceptable manner. To accommodate continuous pan rotation, one or more slip rings can be incorporated into the tilt function linkage. Furthermore, in one embodiment, the camera does not use a cable, either push-pull or pull with spring return. When a cable is not employed, a servo is employed inside. In addition, the potentiometer may be remotely located to the pivot point on the yoke so that the amount of tilt rotation may be varied. Tilt function is normally 90 degrees but sometimes the camera needs to look up so it may be 140. In addition, electronic changes may be made to the potentiometer by adding resistors and/or changing the properties of the potentiometer which changes the amount of servo travel. In this way we can change a 90 degree tilting unit to a 140 degree tilting unit. Accordingly, the scope of protection of this invention is limited only by the following claims and their equivalents.

I claim:

1. A camera mount comprising:
    a housing including a pair of doors in communication with a bottom wall of the housing through which a camera unit is retracted and extended, the doors rotating in a plane parallel to the bottom wall of the housing;
    a retraction assembly within of said housing;
    said assembly including an output arm being extended and retracted with respect to said housing;
    the camera unit pivotally mounted to the output arm;
    a pan servo to rotate the camera unit about a pan axis;
    a tilt servo to rotate the camera unit about a tilt axis; and
    a retract servo to retract and extend the camera unit with respect to the housing.

2. The camera mount of claim 1, wherein said camera unit is in communication with a controller.

3. The camera mount of claim 2, further comprising a door servo to operate said doors.

4. The camera mount of claim 3, further comprising the door servo, in communication with the retract servo, the door servo to limit rotation of the doors to a plane parallel to the bottom wall of the housing and the door servo to rotate the doors from a closed position to an open position to enable extension of the camera unit.

5. The camera mount of claim 3, further comprising the door servo, in communication with the retract servo, the door servo to limit rotation of the doors to a plane parallel to the bottom wall of the housing and the door servo to rotate the doors from an open position to a closed position following retraction of the camera unit semi shell.

6. The camera mount of claim 2, wherein said controller communicates position of the camera unit including retraction, extension, pan, and tilt displacement.

7. The camera mount of claim 1, wherein rotational displacement of the camera unit about the tilt axis is controlled by a control cable driven by the tilt servo.

8. The camera mount of claim 7, wherein said control cable is controlled by a crank driven by the tilt servo.

9. The camera mount of claim 1, wherein extension and retraction assembly employs a carbon fibre plate chassis and a pivot point integral with pan and tilt mounting bolts.

10. A camera mount comprising:
    a housing including a pair of doors in communication with a bottom wall of the housing through which a camera unit is retracted and extended, the rotation of the doors limited to a plane substantially parallel with the bottom wall of the housing;
    a retraction assembly within of said housing;
    said assembly including an output arm being extended and retracted with respect to said housing;
    the camera unit pivotally mounted to the output arm;
    a pan servo to rotate the camera unit about a pan axis;
    a tilt servo to rotate the camera unit about a tilt axis; and
    a retract servo to retract and extend the camera unit with respect to the housing.

11. A camera mount comprising:
    a housing including a pair of doors in a bottom wall of the housing through which a camera unit is retracted and extended, the doors parallel to the bottom wall and configured to rotate substantially parallel to the bottom wall;
    a retraction assembly within of said housing;
    said assembly including an output arm being extended and retracted with respect to said housing;
    the camera unit pivotally mounted to the output arm;
    a pan servo to rotate the camera unit about a pan axis;
    a tilt servo to rotate the camera unit about a tilt axis; and
    a retract servo to retract and extend the camera unit with respect to the housing.

* * * * *